Jan. 18, 1927. 1,615,204
P. B. HUYETTE
ADAPTER FOR WATER GAUGES
Filed Feb. 15 1926 5 Sheets-Sheet 1
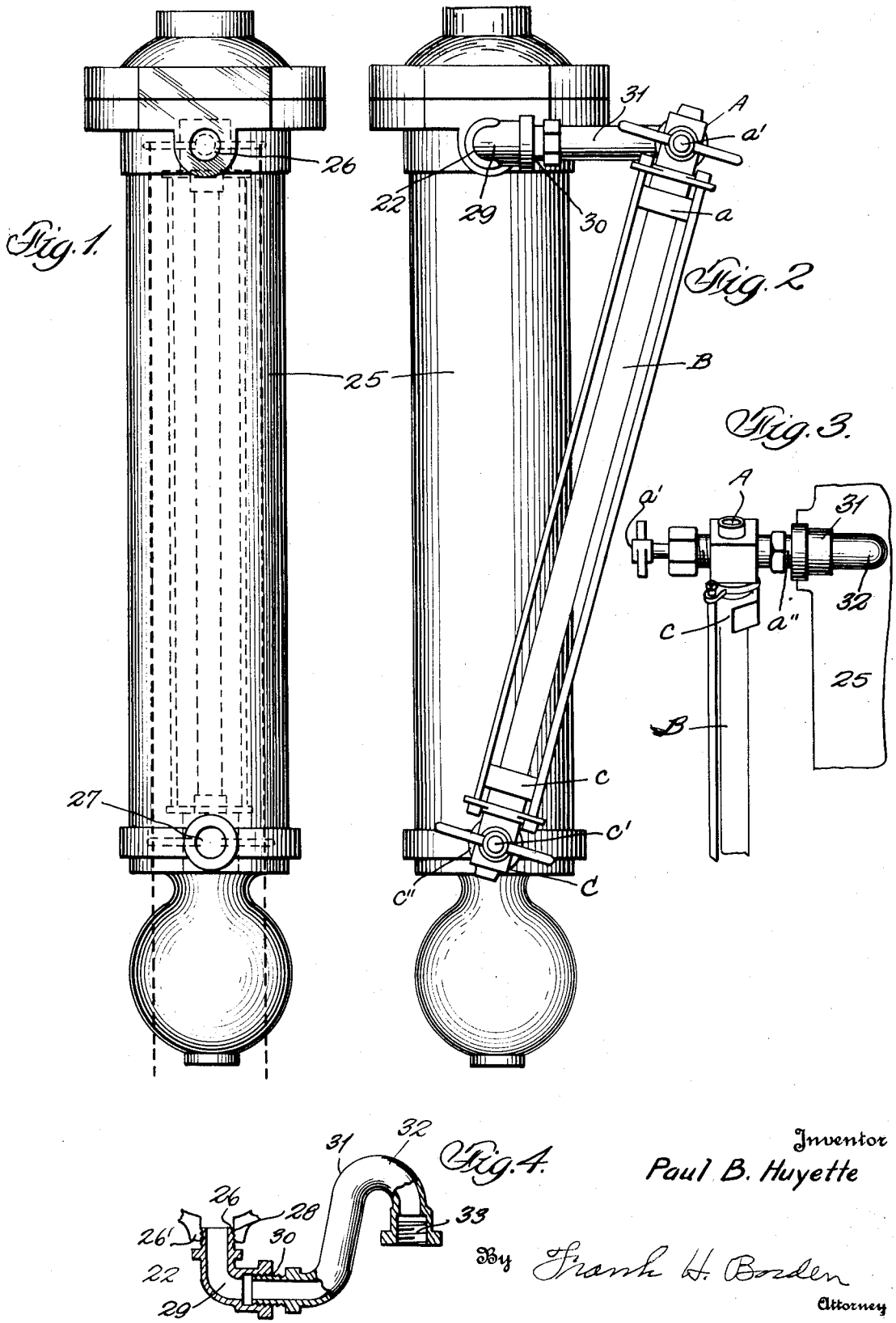
Inventor
Paul B. Huyette
By Frank H. Borden
Attorney

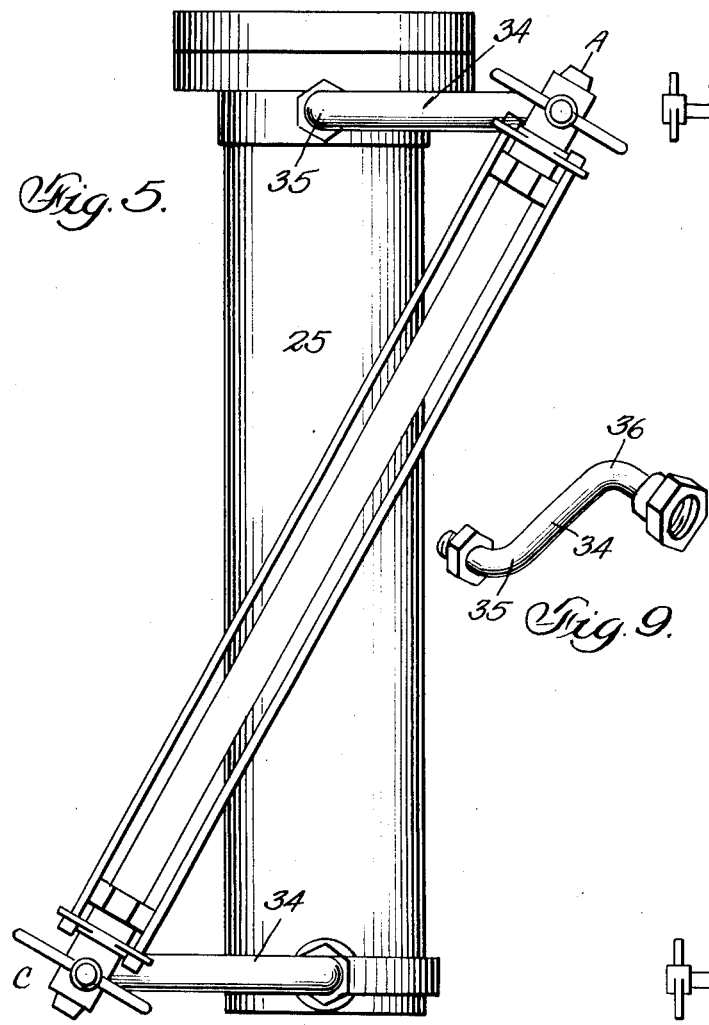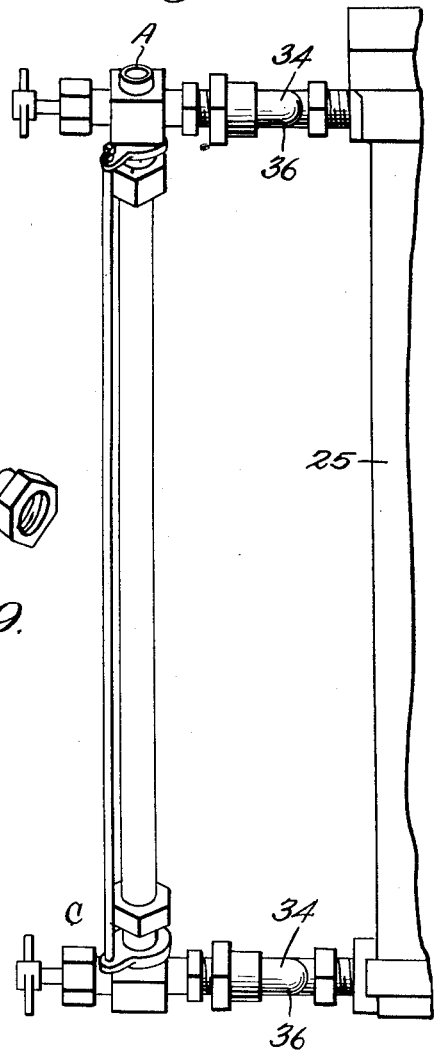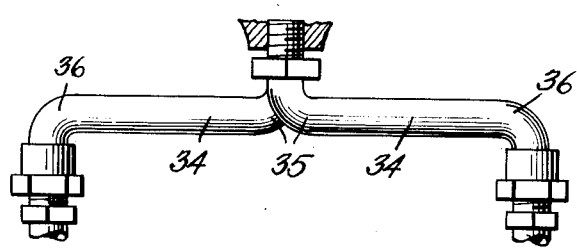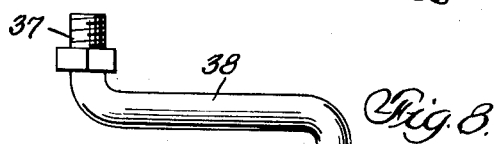

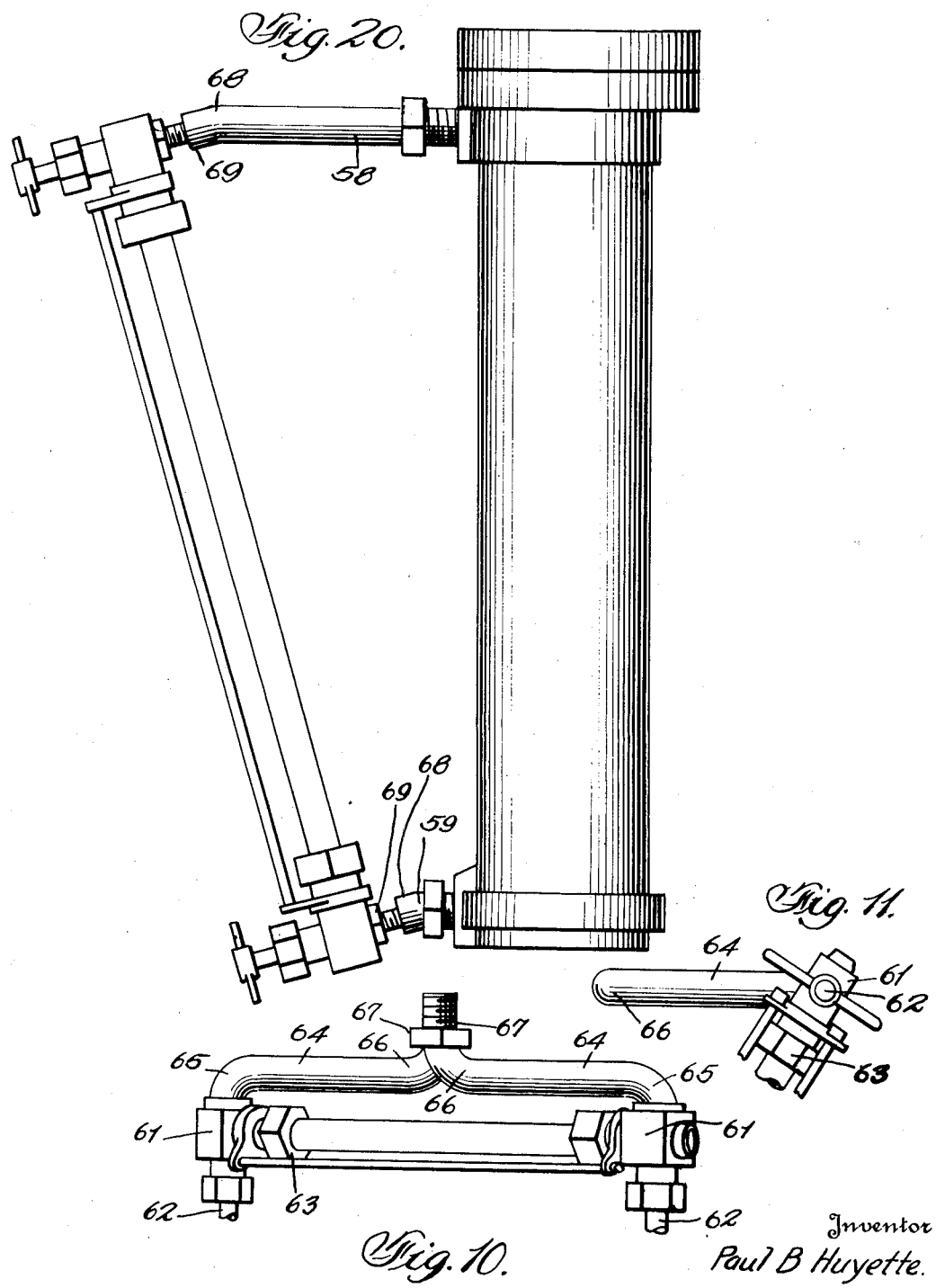

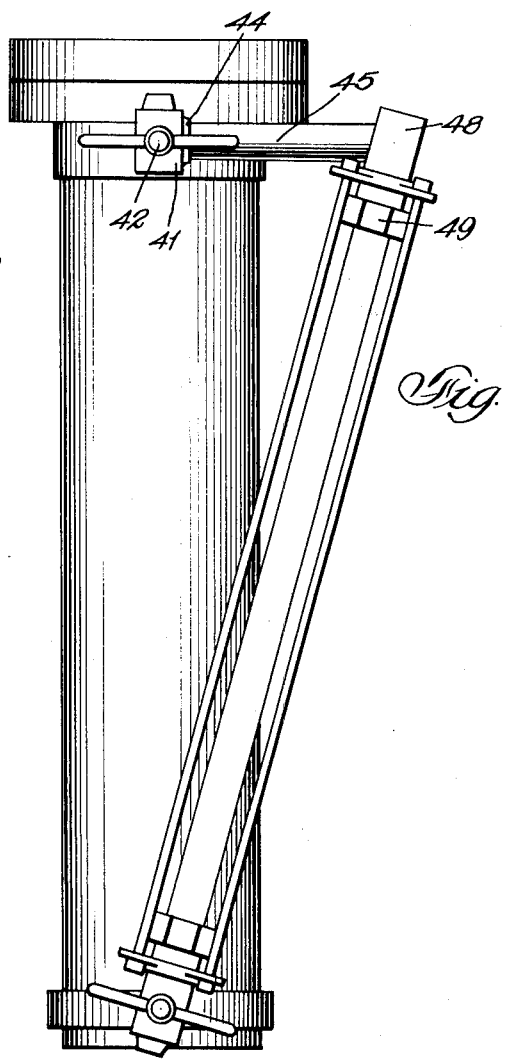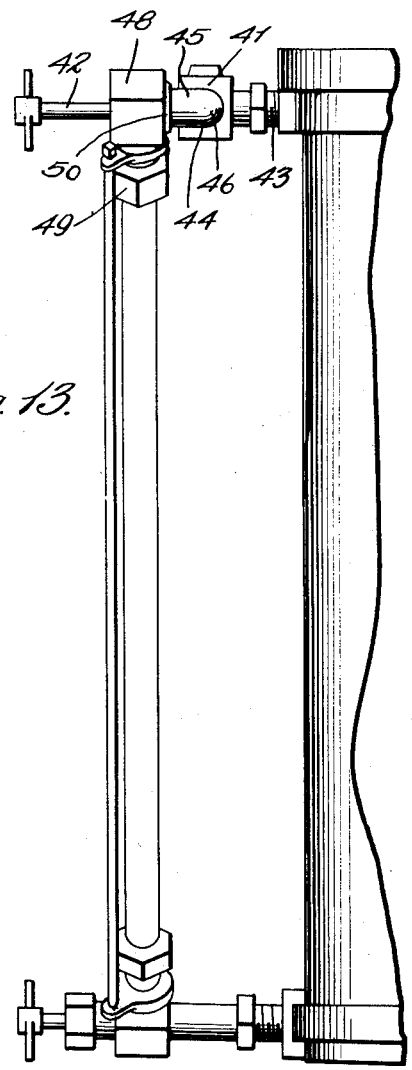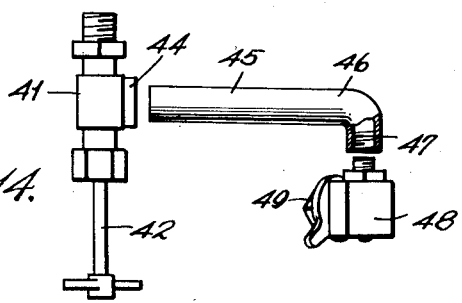

Jan. 18, 1927.
P. B. HUYETTE
ADAPTER FOR WATER GAUGES
Filed Feb. 15, 1926     5 Sheets-Sheet 5
1,615,204
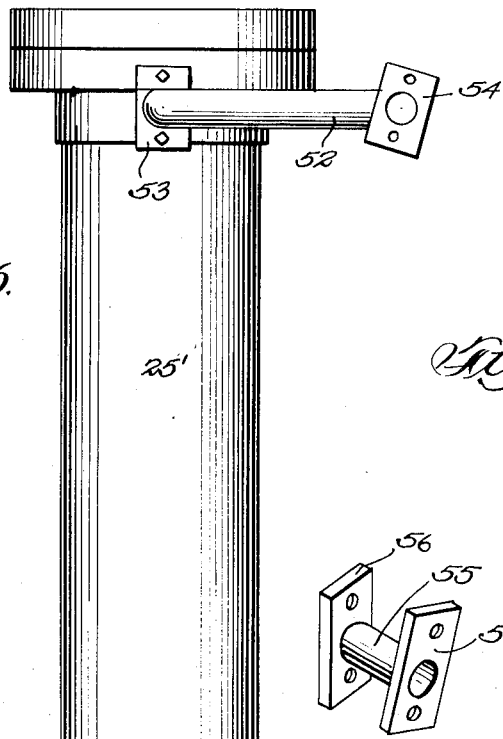
Fig. 16.
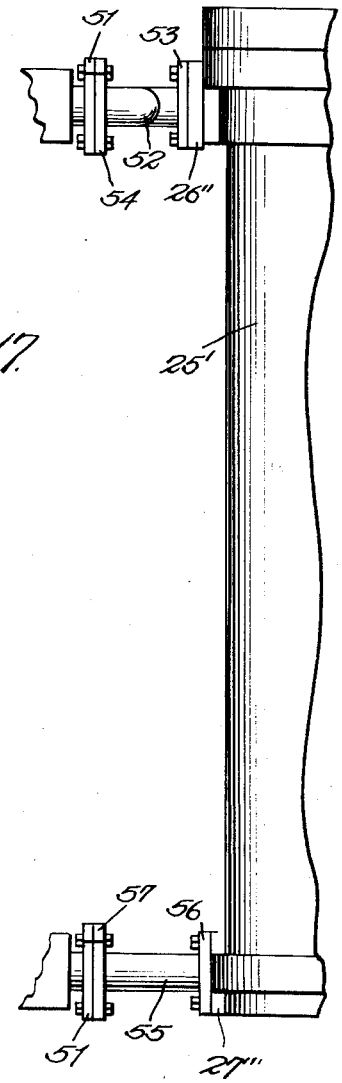
Fig. 17.
Fig. 19.
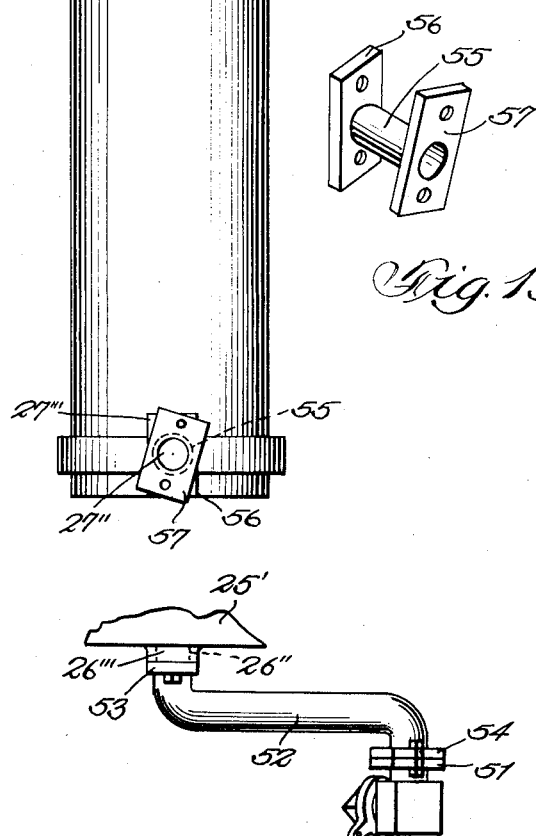
Fig. 18.
Inventor
Paul B. Huyette
By Frank H. Borden
Attorney Patented Jan. 18, 1927.

1,615,204

UNITED STATES PATENT OFFICE.

PAUL B. HUYETTE, OF PHILADELPHIA, PENNSYLVANIA, ASSIGNOR TO PAUL B. HUYETTE CO., INCORPORATED, OF PHILADELPHIA, PENNSYLVANIA, A CORPORATION OF NEW JERSEY.

ADAPTER FOR WATER GAUGES.

Application filed February 15, 1926. Serial No. 88,485.

My invention relates to adapters for water gauges, pertaining particularly to fittings adapting normally vertical water gauges for angular positioning on boilers and water columns for increased visibility of the water level therein.

As boilers have become larger and higher it has become increasingly difficult to read the water level in the water gauges located at a considerable distance from the floor and it has been found advantageous to incline the gauges at an angle to the perpendicular so as to facilitate observations of the water level.

Although it is not broadly new to achieve this effect, applicant being well aware of the activities of inventors along this line, yet so far as known in every case it requires special fittings adapted to maintain the gauge in one position only, or else a modification of the water column structure with which the gauge is associated.

It is customary for dealers to maintain a stock of standard water gauges adapted normally and solely for vertical attachment to boilers and water columns, as there is a rather constant demand for such vertically attached gauges. To provide in the case of high boilers gauges normally and solely adapted for angular positioning would necessitate a duplication of stock and the tying up of capital that would be disadvantageous. Further it is desirable to utilize as many old fittings as may be expedient when making changes or additions to the batteries of boilers in a plant, and hitherto it has been impossible to use old vertical water gauges on new and high boilers with any success, due to the sharp angle formed by the line of sight from below, and the vertical gauge glass.

It is an object of my invention to provide means for affixing a normally vertical water gauge to a receptacle at an angle to the perpendicular.

It is a further object of my invention to provide secondary fitting or fittings adapted for operatively mounting a normally vertical water gauge in the vertically aligned openings in a boiler or other receptacle, but with the water gauge at an angle to the perpendicular.

It is a further object of my invention to provide a water gauge with fittings adapted for application as a unit to the vertically aligned but spaced openings normally provided in a receptacle, whereby the gauge glass is maintained in a position of angularity relative the perpendicular.

Many additional objects and advantages will be apparent upon perusal of the description in connection with the appended drawings.

Although my invention is subject to many modifications and variations, according to conditions, I provide in a preferred form, in connection with a boiler or other receptacle having spaced but vertically aligned openings, and with a normally vertically mounted water gauge, a tubular connection interposed between at least one such opening and an end of the water gauge whereby the gauge is held in an inclined position relative the vertical or perpendicular.

In the accompanying drawings:

Fig. 1, is a front elevation of a water column showing the openings usually formed therein for the reception of the water gauge, and showing, in dotted lines, a conventional water gauge mounted in the openings.

Fig. 2, is a front elevation of a water column with the adapter of my invention engaging between the upper opening in the column and the upper end of the water gauge and the gauge maintained in a position of angularity relative the perpendicular.

Fig. 3, is a fragmentary side elevation of the same.

Fig. 4, is a horizontal section, partially in full lines of the form of adapter shown in Figs. 2 and 3.

Fig. 5, is a front elevation of a water column with an inclined water gauge in position thereon, and supported by a pair of similar but oppositely disposed adapters or fittings.

Fig. 6, is a fragmentary top plan view of the water column and associated water gauge and fittings shown in Fig. 5.

Fig. 7, is a side elevation of the same, in full lines,

Fig. 8, is a top plan view of the mountings shown in Figs. 5, 6, and 7, with a slightly modified form of adapter.

Fig. 9, is a perspective view of one of the arms or adapters shown in Fig. 5.

Fig. 10, is a top plan view of a further modified form of the invention similar to the disclosure in Figures 5, 6, 7, 8 and 9, in general, but disclosing the adapters and gauge fitting as being integral parts of the unitary structure, Fig. 11, is a front elevation of the upper fitting.

Fig. 12, is a front elevation of a further modified form of an adapter utilizing a valve fitting in one opening and in which a modified form of upper gauge fitting may be used.

Fig. 13, is a side elevation of the same.

Fig. 14, is a detached view showing the elements of the adapter shown in Figures 12 and 13.

Fig. 15, is a detailed view of the modified form of upper fitting for the gauge as shown in Figures 12, 13 and 14.

Fig. 16, is a front elevation of a further modified form of my invention applicable to water gauges having flange fitting normally engaging a flange receiving plate on the water column with the water gauge omitted.

Fig. 17, is a side elevation of the adapters shown in Figure 16.

Fig. 18, is a top plan view of the upper adapter for the flanged fitting.

Fig. 19, is a perspective view of the lower fitting according to the form of my invention as disclosed in Figure 16.

Fig. 20, is a side elevation of a water column with a water gauge supported thereon in a different or modified form of angular relation incident to the modified adapter disclosed therein.

For illustrative purposes the invention will be shown as being applied to a standard water column 25, although obviously applicable to any other sort of receptacle, whether boiler, tank, or vat, and the term "receptacle" is intended to cover any such as might require a level indicating device.

The receptacle 25 is provided customarily with upper and lower threaded gauge openings 26 and 27, in which normally a standard water gauge is mounted. It will be noted that the openings are in vertical alignment and that in the normal course with a standard water gauge the water gauge will therefore be held in a vertical position as indicated in dotted lines in Fig. 1.

There are many situations in which such a sharp angle is formed between the gauge glass and the line of sight of an observer looking up from below that accurate reading of the level of the liquid in the receptacle. It is very desirable that the gauge be held at an angle to the vertical for an enhanced vision of the fluid level.

In Figs. 2, 3 and 4, I show one form of my invention to achieve the desired result with a minimum of effort. In this form of my invention I provide the conventional water column 25 having the previously noted openings 26 and 27, in which a standard water gauge is mounted. The water gauge as is well known, comprises an upper valvular fitting A, gauge glass B, and lower valvular fitting C. The fittings have each a flanged glass receiving gland, respectively $a$ and $c$, perpendicular to the axial extent of the valve stems $a'$ and $c'$, and each terminates in an axially extending threaded shank, respectively $a''$ and $c''$, adapted to be received in the threaded openings 26 and 27.

The upper fitting is removed from its engagement with the upper hole in the receptacle, and the threaded shank 28 of the L, 29 is screwed into the upper opening. The L has an internally threaded opening 30, substantially at right angles to the axis of the shank. Into the threaded opening 30 is screwed the tubular conduit element 31, having the deep curve 32, so as to bring the face of the internally threaded connection 33 in the plane of the conventional raised surface 26' concentric with the opening 26 in the receptacle 25. It will be noted that the adapter as shown in Figure 4 comprises the two parts 29 and 31, and in its assembled condition comprises a conduit.

The threaded shank of the upper fitting A is then screwed into the threaded connection 33 of the conduit element in the position shown in Figures 2 and 3. In this position in order to maintain the same ratio of visible area in the glass it would be necessary to provide a longer glass. This is helpful, but by no means essential, and the same glass may be used if desired, by dropping the connection end of the conduit so that it is below the horizontal, or at an angle to the horizontal, as will be quite obvious.

With this form of the invention it is possible to vary the angle of the water gauge in its simplest form. Obviously, and as shown by a modification of the invention to be described, the conduit may be made of but one piece, but as there are sometimes projections or flanges on water columns that would make it difficult to swing the entire conduit about its threaded shank for purposes of inserting it, the plurality of pieces shown is preferred. There are few cases indeed in which the short L of this form of the invention could not be inserted, but I wish it to be considered in the purview of this invention to make the conduit unitary or an assembly.

There is an advantage in this form that might be mentioned, inasmuch as the lower fitting need not be changed, it being simply screwed in a bit further, to permit the fitting to be turned to the proper angle to receive the originally vertical, but not angularly positioned gauge glass. It is because the lower fitting remains in practically the same position and the distance between the receptacle and the gauge glass is unchanged that it is advisable to provide the deep curve shown in the conduit, and which forms an upper connection substantially in the plane of the connection of the lower fitting.

The invention may take the form shown in Figures 5, 6, and 7, in which a pair of similar adapters or conduits are used to obtain the desired result. In this form of the device the upper and lower fittings A and C of the water gauge are removed from the openings in the receptacle 25, and a pair of conduits or adapters 34 provided for threaded insertion in the respective openings of the receptacle. As shown in Figure 6, the adapter comprises a relatively short conduit having oppositely disposed terminal connections 35 and 36. Each conduit connection at the receptacle end is externally threaded to engage the openings in the receptacle, and the other end is internally threaded to receive the threaded shank of the appropriate water gauge fitting. This will be clear, as will the fact that the conduits used with this form of the device may be approximately one half as long as the adapter shown in Figures 2, 3, and 4 to secure the desired degree of angularity of the gauge glass. They may well be made integral or unitary, as being shorter they are less likely to strike obstructions or projections on the receptacle.

In Fig. 8, I show a slightly modified form of the twin adapters shown in Figures 5, 6, and 7, in which the receptacle end 37 and major portion of the conduit 38 are similar to said figures, but which is provided with a threaded union 39, and the internally threaded coupling member 40, in which the threaded shank of the gauge fitting is engaged. The union permits a very tight joint to be formed between the water gauge fittings and the conduit, as they may be tightened to any desired extent without affecting the adjusted position of the water gauge, as the union permits tightening of the parts to secure a desired adjustment after the coupling is tight.

As shown in Figures 10 and 11 my invention also contemplates forming the fittings of the gauge integral with the adapters in that special stocks are desired to be carried or that the structure is found more advisable for use than the detached adapters previously described.

As shown in these figures, the lower fitting 61 has a valve stem 62 projecting from it perpendicular to the stem is the glass receiving gland 63 and from the body 61 the conduit 64 having curves or bends, 65 and 66 emerges terminating in the externally threaded shank 67 for the insertion in the opening of the receptacle.

The upper fitting comprises the same structure as the lower fitting and will not be described in detail except that the conduit projects laterally from the upper fitting in the opposite direction from the projection of the conduit of the lower fitting as will be obvious.

With the forms of adapters shown thus far as applied to a standard water gauge which may or may not already be installed on the receptacle, it is found that the outer, or lever ends of the valve stems are not in vertical alignment, and although many compensating features may be utilized to overcome this feature, another factor of possible importance is that when the valves are actuated considerable strain is imposed upon the parts which might under certain conditions be disadvantageous. To overcome any possible criticism on these grounds, I provide an adapter as shown in Figures 12, 13 and 14. This adapter will be described as being applied only to the upper fitting, although obviously in view of my previous descriptions, it might equally well be applied to the bottom, or to both. The main feature in these figures is the substitution of a valve 41 for the L shown in Figs. 2, 3 and 4, for instance. The valve 41 has an axial threaded extension 43 adapted for threaded engagement with the upper opening 26 of the receptacle, and the valve stem 42 extends from the valve on the opposite side from the extension.

When the valve is inserted, it will be noted that the valve stem and operating mechanism is in a plane passing through the valve of the lower fitting of the water gauge. The valve is provided with a lateral internally threaded port 44, into which the straight shank of the conduit element 45 is screwed, and which element has a curve or bend 46 to bring the internally threaded connection 47 into engageable position for the threaded shank of the upper gauge fitting.

As this duplicates the valves of the upper portion of the fitting, it may be advantageous to eliminate one such valve on new installations, although this is not essential in any way, as by providing an upper fitting as shown in Figure 15, in which a body 48 has a glass engaging gland 49, and at right angles thereto has the externally threaded shank 50 adapted to engage the connection of the conduit as will be clear.

Some installations of water gauges and their associated water columns, are provided with cooperating flanges and flange surfaces and for adapting such vertical water gauges to angular positioning I utilize forms of adapters as shown in Figures 16, 17, 18 and 19.

The water column 25' has upper opening 26", surrounded by a flange receiving depression 26''', and the lower opening 27" has a similar flange receiving surface 27'''. The upper gauge fitting instead of a threaded shank or projection for entry into the opening in the receptacle has a flange 51, normally seating on the surface or in the depression 26'''' to which it is bolted by bolts passing through openings on either side of the passage opening 26''. The adapter used in such cases comprises a conduit 52 terminating at each end in opposed flanges 53 and 54, for bolted engagement respectively with the surface on the receptacle and the flange on the upper fitting. As it is not possible to change the angle of the lower flange due to the shape of the surface or depression 27''', the short adapter shown in Figure 19 is used. This comprises a short straight conduit 55 having inner and outer opposed parallel flanges, 56 and 57 but with their respective axis at an angle as indicated.

The lower flanged fitting of the gauge is bolted to the outer flange of the lower adapter, then the inner flange 55 of the adapter is fastened to the surface or depression 27''' as will be understood.

It might be advisable to provide an adapter for maintaining a normally vertical water gauge in a different angular relation to a receptacle, and in a plane divergent from the plane of the face of the receptacle, in which case the adapters shown in Figure 20 may be used. These comprise straight tubular conduits of different lengths, of which the upper, 58, is the longer, and the lower, 59 is the shorter, each has a threaded shank adapted for axial engagement in the openings in the receptacle, and each has an angular bend or curve 68, adjacent on internally threaded connection 69 formed integrally, (preferably) to receive the threaded shank of the appropriate gauge fitting. This adapter is quite simple and feasible and answers every requirement.

The advantages of my invention are thought to be obvious. Although of the utmost simplicity and ease in application, yet it fills a long-felt want, and will be the means of saving large sums in utilization of used gauges, in an angular position on receptacles.

I have shown and described several modifications of the invention that have occurred to me, and wish all such and many others that may occur to others to be considered in the scope of the following claims. In connection with which I wish to make it known that I am well aware of the inventions disclosed in the following and other patents, and do not claim the structures set forth therein: Blevney, 688,287, Lank, 1,307,982, Ernst, 1,448,920, and 1,511,325.

I claim as my invention:

1. The combination with a receptacle having openings in substantially vertical alignment, a water gauge adapted normally for vertical positioning on said receptacle in said openings in a plane perpendicular to the axes of the openings, one end of said gauge operatively communicating with one of said openings, and means extending laterally between the other end of said gauge and the other opening and supporting the gauge at an angle to the vertical but in a plane perpendicular to the axes of said openings.

2. The combination with a receptacle having openings in substantially vertical alignment, a water gauge adapted normally for vertical positioning on said receptacle in said openings, one end of said gauge operatively communicating with one of said openings, and means extending laterally between the other opening and the other end of said gauge for supporting the gauge at an angle to the vertical but in the same vertical plane as such normal mounting.

3. The combination with a receptacle having vertically aligned openings, of a water gauge adapted to be normally mounted on the receptacle in operative connection with the openings and in a plane perpendicular to the axis of the openings, of means interposed between one of said openings and an end of the water gauge for laterally offsetting said end of the water gauge without affecting the operative connection of the other end of said water gauge with said other opening, the whole so arranged that the water gauge is held in substantially the same plane as its normal mounting but at an angle to the perpendicular.

4. As an article of manufacture associated with a receptacle having openings in vertical alignment and with a water gauge provided with fittings adapted to be normally mounted on the receptacle in said openings, a conduit terminating at each end in an annular connection, said conduit having bends or curves so that the connections project in opposite directions with the axis of each connection parallel with the axis of the other connection, and having one connection engaged in one of such openings and the other engaged with a fitting of such water gauge whereby the water gauge is maintained operatively in a position at an angle with the vertical.

5. The combination with a water gauge comprising upper and lower integral fittings and a gauge glass, the fittings provided with lateral extensions adapted for connection with vertically aligned openings in a receptacle for normally supporting the gauge in a vertical position, of means connected at one end with the extension of one fitting and having a passage in communication with the gauge, the other end of which means terminates in a lateral connection vertically in alignment with the lateral extension of said other fitting, said connection and said last mentioned extension engaged with the openings in said receptacle so that the gauge is held laterally in a position of angularity relative the vertical.

6. The combination with a receptacle having substantially vertically aligned openings and adapted normally to support and receive a water gauge vertically on the receptacle, of conduit means engaged with one of said openings in communication with the receptacle, said conduit terminating laterally in a ported connection out of vertical alignment with the other opening, said last mentioned opening and said ported connection arranged for supporting a water gauge at an angle to the vertical.

7. The combination with a receptacle having vertically aligned openings, of a water gauge adapted to be normally mounted on the receptacle in operative connection with the openings, of a conduit terminating in connections and interposed between and engaged respectively with one of said openings and an end of the water gauge for laterally off-setting said end of the water gauge from registry with the opening with which it is normally engaged, the other end of said water gauge being in operative communication with the said other opening in said receptacle, and said conduit formed of a plurality of sections for easy and accurate assembly of the whole.

8. As an adapter for angular positioning of normally vertical water gauges on a receptacle having vertically aligned openings, a conduit terminating in connections for engagement respectively with the receptacle and a portion of such gauge, said conduit comprising a relatively short L threaded at each end, a tubular element threadably engaging said L and having a curve and terminating in a threaded connection substantially in the plane of the face of the receptacle.

In testimony whereof I affix my signature.

PAUL B. HUYETTE.